United States Patent [19]
Dennis et al.

[11] 3,744,891
[45] July 10, 1973

[54] TWO-DIMENSION REPEATABLE, POSITIONABLE TABLE

[75] Inventors: Ralph E. Dennis, Rockville; Robert C. Green, Bethesda, both of Md.; James J. Honn, Manassas, Va.; James H. Nottingham, Gaithersburg, Md.

[73] Assignee: International Business Machines Corporation, Armonk, N.Y.

[22] Filed: Nov. 25, 1970

[21] Appl. No.: 92,787

[52] U.S. Cl. .................................. 353/27, 33/1 M
[51] Int. Cl. ...................... G03b 23/08, B431 5/00
[58] Field of Search................... 108/102, 137, 143, 108/20; 355/40, 43, 53, 86, 95; 353/27, 25, 26, 74–78; 95/37; 33/1 M

[56] References Cited
UNITED STATES PATENTS

| | | | |
|---|---|---|---|
| 3,442,586 | 5/1969 | Coil | 355/27 |
| 3,195,399 | 8/1965 | Jonker | 353/27 |
| 3,528,735 | 9/1970 | Bluitt | 353/27 |
| 2,660,920 | 12/1953 | McChesney | 383/27 |
| 3,225,652 | 12/1965 | Sauppe | 383/25 |

FOREIGN PATENTS OR APPLICATIONS

| | | | |
|---|---|---|---|
| 693,234 | 8/1964 | Canada | 353/27 |

*Primary Examiner*—Louis R. Prince
*Assistant Examiner*—A. J. Mirabito
*Attorney*—Hanifin & Jancin and Laurence R. Letson

[57] ABSTRACT

An X-Y table capable of repeatably being positioned accurately in predetermined coordinate positions. The table is driven by a single electric motor for a power source which positions the table in both coordinates, either simultaneously or sequentially, and is accurately positioned by electromechanical solenoids for locking the table into predefined positions, thereby providing repeatability and reliability of positioning of the material carried by the table.

7 Claims, 3 Drawing Figures

INVENTORS
RALPH E. DENNIS, ROBERT C. GREEN
JAMES J. HONN, JAMES H. NOTTINGHAM

BY *Laurence R. Letson*

AGENT

TWO-DIMENSION REPEATABLE, POSITIONABLE TABLE

BACKGROUND OF THE INVENTION

X-Y tables are well known in the prior art. The prior art devices can be broken into essentially three different categories. These categories are: 1) lead screw moved tables, 2) inclined plane and follower actuated tables, and 3) manually operated X-Y tables.

Generally speaking, the lead screw type of X-Y table or positioning device requires expensive drive motors of the stepping motor type to accurately increment the table in predetermined increments. Further, there is required a very high degree of precision in the manufacturing tolerances and the controls for the table to accurately reposition the material carried by the table in the same position on different positioning moves. The position of the X-Y table in a lead screw arrangement is dependent upon the amounts that the lead screws are rotated and the angular position in which the lead screw is stopped. This type of table is highly valuable where extremely small and very, very precise movements are required but is not advantageous when rapid access and high degree of repeatability is required and where the cost of manufacturing is a significant factor. For a high degree of repeatability, extremely high tolerances are required, increasing the cost of manufacture and, hence, reducing the desirability of a lead screw X-Y table for mass production positioning apparatuses.

Inclined plane controlled X-Y tables suffer from some of the same drawbacks as the lead screw controlled table, namely, the need for extremely high tolerances to gain repeatability of positioning and the high cost of manufacture. Controls for the incline plane and follower controlled X-Y tables require precise manufacture and control in and of themselves in order to accurately position the table. Further, the control of the drive motors for this type of X-Y table requires interconnected controls between the motor controlling each direction of movement and it also requires motors with extremely fast torque responses and well-defined start/stop characteristics to prevent the overrunning or underrunning of a desired position. The positioning of the table is under the control of the motor and its incline plane following mechanism and there are no predefined positions which lend a high degree of repeatability to the positioning devices disclosed in this specification.

Hand controlled and hand activated X-Y positioning tables are likewise not accurate and are not particularly adapted for repeatability where accuracy of positioning is a factor. Hand controlled X-Y positioners rely entirely upon the operator for positioning and because of the characteristics of such a positioner, the speed of access to a particular position is entirely dependent upon the skill and manual dexterity of the operator. Even then, repeatability of exact positioning is quite low. Further, the manual system is not controllable by an external control device other than the operator and does not respond to any signals generated by a data processing apparatus.

In some environments, such as microfiche projection, a particular small segment of a transparency must be accurately positioned in line with an optical system to allow light to be projected upon a viewing screen. The transparency segment to be enlarged is very, very small compared to the ultimate enlargement and, therefore, must be very accurately positioned in the optical viewing system. This calls for a high degree of repeatability. The carrier carrying the transparency must be capable of being positioned repeatedly in exactly the same relationship so that a transparency sheet carried by the carrier will be capable of being aligned with the optical system and thereby allow the enlargement of an entire segment or frame of the transparency. This repeatability requirement is present even though some small deviations are allowable and the apparatus for positioning the microfiche sheet may have relatively large manufacturing tolerances. Another factor involved in the projection of microfiche transparencies is that the machine must respond with a fairly rapid movement and still move accurately and quickly in order to conserve both the operator's time and provide rapid access to the information carried in the frames of the microfiche sheet.

OBJECTS OF THE INVENTION

It is a primary object of this invention to rapidly and accurately position a member with a high degree of repeatability in response to a single driving element providing the positioning forces for both directions.

It is another object of this invention to repeatably and accurately position an apparatus in discrete defined positions in two directions, rapidly in response to exterior signals and controls, with a single power drive for providing movement in both directions, inexpensively and simply.

It is still another object of this invention to eliminate the need for random search when seeking a defined incremental position with an X-Y positioning device in an apparatus having one power means for providing movement in both directions.

SUMMARY OF THE INVENTION

In order to accomplish the foregoing objects an X-Y table is moved by a single continuously running electric motor which moves the X-Y table in one or both directions in a two-dimensional positioning scheme and at the same time, stores energy in a spring motor for each direction allowing the repositioning of the X-Y table to a home position when the drive motor is disengaged. The engaging and disengaging of the electric motor is accomplished through an electrical clutch which is controlled by the position of the table with respect to a preselected address or position, keyed or coded into the control circuit. The clutch disengages when the table has reached both linear coordinates defining its address and remains in that position until instructed by an external control signal to imcrement to a home position or a second address. The repeatability of the X-Y table is accomplished by a solenoid controlling the positioning of the table in both the X and Y direction and thereby relieving the drive mechanism from a requirement of exact precise positioning. The solenoids engage centering surfaces on the X-Y table providing accuracy and repeatability of position.

The foregoing and other objects, features and advantages of the invention will be apparent from the following more particular description of preferred embodiments of the invention, as illustrated in the accompanying drawings.

DESCRIPTION OF THE INVENTION

Figure 3:
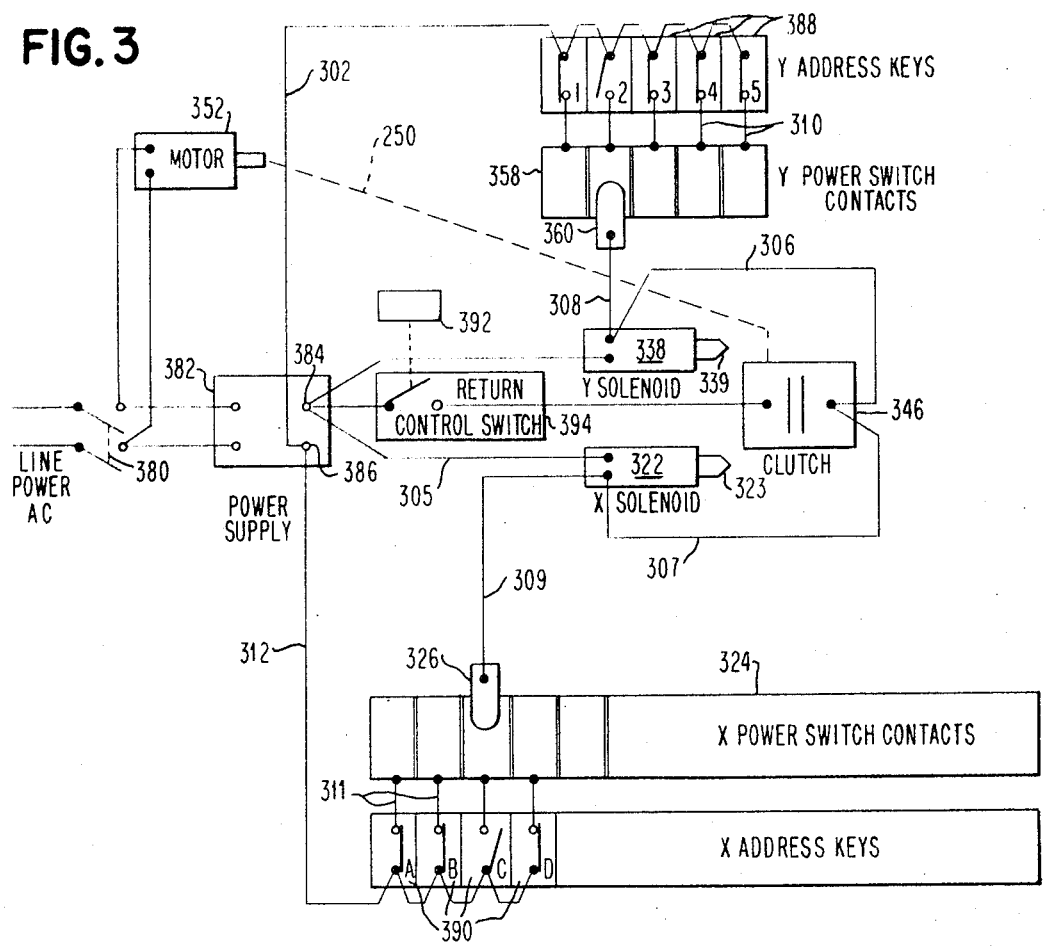
FIG. 3 is a schematic diagram of the electrical control circuit for controlling the position of the X-Y table illustrated in FIG. 1.

The X-Y positioner or X-Y table will be described within the environment of a microfiche enlargement and projection apparatus; however, it should be recognized that this particular invention could and may be used in many different environments. The choice of the microfiche projection and enlargement environment is to make an understanding of the invention more complete.

To support the X-Y positioner, a frame 210 stationary support means is provided; this frame 210 may be a part of the microfiche projection apparatus or may be a separate frame mounted within the projection frame. In either event, provided on that frame are two slideways 212 oriented in the X direction. Hereafter, these will be referred to as the X slideways.

Mounted to slide on the X slideways 212 is the X table 214 or first moveable support means. The X table 214 is moveable only in the X direction. Supported by the frame 210 is a clock spring motor 216 having a power spring for storing energy. This clock spring motor 216 will hereafter be referred to as the X spring motor. Interconnecting the X table 214 and X spring motor 216 is a wire cable or cord 218. This will be referred to as the X cable. X spring motor 216 is the type spring motor which winds the power spring within the spring motor when the X cable 218 is extended from the X spring motor 216. This stores energy in the wound spring within X spring motor 216 and provides sufficient energy to recoil X cable 218 when the tension of X cable 218 is reduced.

Additionally, the X table 214 carries on or near one its sides a centering rack, hereafter referred to as the X centering rack 220. The X centering rack 220 is oriented such that its axis extends parallel to the X direction of movement described by the direction of travel of X table 214. The centering rack moves with, and as a part of, X table 214.

Frame 210 supports a latching means preferably a solenoid 322, which will be referred to as the X solenoid, positioned to engage the X detent bar 220 upon electrical command. The axis of movement of the solenoid plunger of the X solenoid 322 is generally perpendicular to the X direction of the X-Y positioner. This allows the plunger of the X solenoid 322 to engage the cam surfaces of the X centering rack 220.

Frame 210 carries along its side and parallel to the X direction a segmented X contact strip 324. X contact strip 324 is broken into discrete segments which are electrically isolated from each other. The individual segments of the X contact strip are of the same linear dimension as the distance between discrete positions of the X table as defined by the distances between cam positions on the X centering rack 220. These two linear dimensions are defined by the distance between the discrete positions which the X-Y positioner may assume in the X direction. To make electrical contact with the individual segments of the X contact strip 324 an X slider brush 326 is provided. X contact strip 324 and X slider brush 326 complete a circuit which is part of the control circuit illustrated in FIG. 2. The description and explanation of this circuit will be discussed more fully below.

As supported by the X table 214 and an integral part thereof are Y slideways 228. Y slideways 228 provide a support and guide for the Y table 230 or second moveable support means supported thereon. A Y spring motor 232 is mounted on one side of the X table 214. Extending from the Y spring motor 232 and connected to the Y table 230 is Y cable 234. Y spring motor 232 and Y cable 234 are analogous and identical to spring motor 216 and X cable 218 with the exception of their mounting point and the direction.

The X and Y spring motors 216, 232 and X and Y cables 218, 234, respectively, comprise the repositioning means.

The Y cable 234 extends parallel to the Y coordinate or direction of travel of the X-Y positioning device. The Y spring motor 232 is structurally and functionally identical to X spring motor 216 in that as Y cable 234 is pulled from the reel of Y spring motor 232 a clock spring inside the Y spring motor 232 is wound storing energy to later recoil Y cable 234.

Supported on or as an integral part of Y table 230, Y centering rack 236 is provided along one edge of the Y table 230. This edge is one of the two edges not connected with Y cable 234 or the edge opposite thereof. The Y centering rack 236 is formed with cam surfaces in one surface of the bar. These cam surfaces as with the X centering rack 220 are formed such that their dimensions between identical points of each cam surface are separated by a distance equal to the Y increment between discrete Y positions of the Y table 230. As can be seen from later explanation the definition of the number of positions that Y table 230 will occupy in the Y direction defines the number of cam surfaces and the dimension of the object carried by Y table 230 and the number of positions will determine the dimension between identical points on adjacent cam surfaces.

Y table 230 carries on it a Y contact strip 358. Y contact strip 358 moves with Y table 230 and is part of the electrical control circuit illustrated in FIG. 3. X table 214 carries the Y slider brush 360 which makes a sliding contact with Y contact strip 358. Y slider brush 360 is carried by X table 214 and remains in a fixed position relative to table 214. However, the Y table 230 and the Y contact strip 358 move with respect to Y slider brush 360. Y contact strip 358 is segmented into equal space electrically conductive segments, one segment for each position defined by the Y centering rack 236.

To provide a locking and centering of the Y centering rack 236 and the Y table 230, into selected defined positions in the Y direction, a Y solenoid 338 is provided. The Y solenoid 338 is provided. The Y solenoid 338 is mounted on the X table and remains stationary with respect to the axis of movement of Y table 230. Y solenoid 338 is identical with X solenoid 322. Both solenoids, 322 and 338 provide a locking and centering function with respect to their respective tables and respective centering rack 220 and 236. To provide a means for transmitting the motive force to both the X table 214 and Y table 230, cable 240 is provided. Cable 240 is attached to the Y table 230 on the side opposite the one to which Y cable 234 is attached. From the attachment point on Y table 230 cable 240 extends in the Y direction to a directional change pulley 242. The X and Y centering racks 220, 236 and X and Y solenoids 322 and 338 comprise the locking and centering means.

Directional change pulley 242 is rigidly supported on X table 214 and provides a means for changing the direction of cable 240 from the Y direction to the X direction. Cable 240 is passed around pulley 242 and directed in the X direction and toward the opposite end of X table 214 from the end attached to X cable 218. Cable 240 extends past the end of X slideways 212 to a take-up reel 244. To provide the driving force to take-up reel 244 output shaft 248 is connected to reel 244. Output shaft 248 is connected to the output portion of electromagnetic clutch 246 which is supported by and carried on the frame 210 of the X-Y positioner.

The driving rotating movement is imparted to the electromagnetic clutch 346 through input shaft 250 interconnecting the electromagnetic clutch 346 and electric motor 252. Electric motor 352 is supported and carried on frame 210. The electric motor 352 together with shaft 250, clutch 346, reel 244 and cable 240 all are parts of the power means.

Y table 230 may be constructed with a transparent support platen and a transparent cover 254 where the environment of the X-Y positioner dictates the transmission of light through the Y table 230. Such an environment would be the environment envisioned herein, that being a microfiche projection and enlargement apparatus. The transparent cover 254 allows any light transmitted through Y table 230 to pass through the cover 254 and also allows the holding of a microfiche transparency 256 in a very flat relationship to Y table 230. This eliminates the problem of a wide range of positions in which microfiche 256 may be positioned and reduces the problems associated with accurate and fine focusing of the optical elements of the enlarging and projecting apparatus. It should be understood that if there be no need for light transmission Y table 230 need not be transparent and if the object carried by Y table 230 does not require a very accurate positioning in the third dimensional axis perpendicular to the X and Y axes then there would be no need for a cover 254. The optical system of the projection and enlargement apparatus and its position with respect to the frame of the projection apparatus and the position of the frame 210 of the X-Y positioner defines a point or area through which light may be projected and then be transmitted by the optical system. This will be referred to as the viewing position 257 and remains fixed while X table 214 and Y table 230 move with respect to the viewing position 257.

The description of the electrical and electromechanical controls for the X-Y positioning device, shown in FIG. 3 will be made referring to FIG. 3. To power the drive and controls of the X-Y positioning device a connection to the available electrical line voltage is provided. This is in the form of a double pole single throw switch 380. Connected to switch 380 is a continuously running electrical motor 352.

A reduced voltage power supply 382 is provided and connected to the line voltage by switch 380 for the purpose of reducing the voltage from the line voltage to a lower voltage and for converting the alternating current voltage of the line to a direct current.

Y solenoid 338 is electrically interconnected by line 303 with one of the two output terminals of power supply 382. From the second terminal of the Y solenoid 338 a conductor 308 is connected to the Y slider brush 360. The Y slider brush 360 makes a rubbing electrical contact with the Y contact strip 358. The Y contact strip 358 is segmented into discrete segments which correspond in number to the number of positions of the Y axis which the Y table 230 may occupy. Each segment of Y contact strip 358 is electrically isolated from its adjacent segments by any suitable insulating material. Each individual segment of Y contact strip 358 is connected by line 310 to one terminal on a key operated or relay operated switch 388. There is one individual switch 388 or relay for each segment of the Y contact strip 358. Terminal 386 of power supply 382 is conneted to the other of the two terminals for each switch or relay 388. Terminal 384 of power supply 382 is likewise connected to X solenoid 322 by line 305. The second terminal of X solenoid 322 is analogously connected to X slider brush 326 by line 309. X slider brush 326 makes a wiping electrical contact with the individual segments of X slider strip 324. As discussed above with respect to Y slider strip 358, X slider strip 324 is comprised of individual electrically segregated segments which are in turn connected to one of two terminals of each of the control switches or relays 390 by lines 311. Terminal 386 of power supply 382 is serially connected by line 312 to the other of the two terminals on each switch or relay 390.

Terminal 384 of power supply 382 is further connected to one terminal of an electromagnetic clutch 346. The second terminal of the electromagnetic clutch 346 is connected to the same terminals of Y solenoid 338 and X solenoid 322 as the Y and X slider brushes 360 and 326 by lines 306 and 307, respectively.

Figure 2:
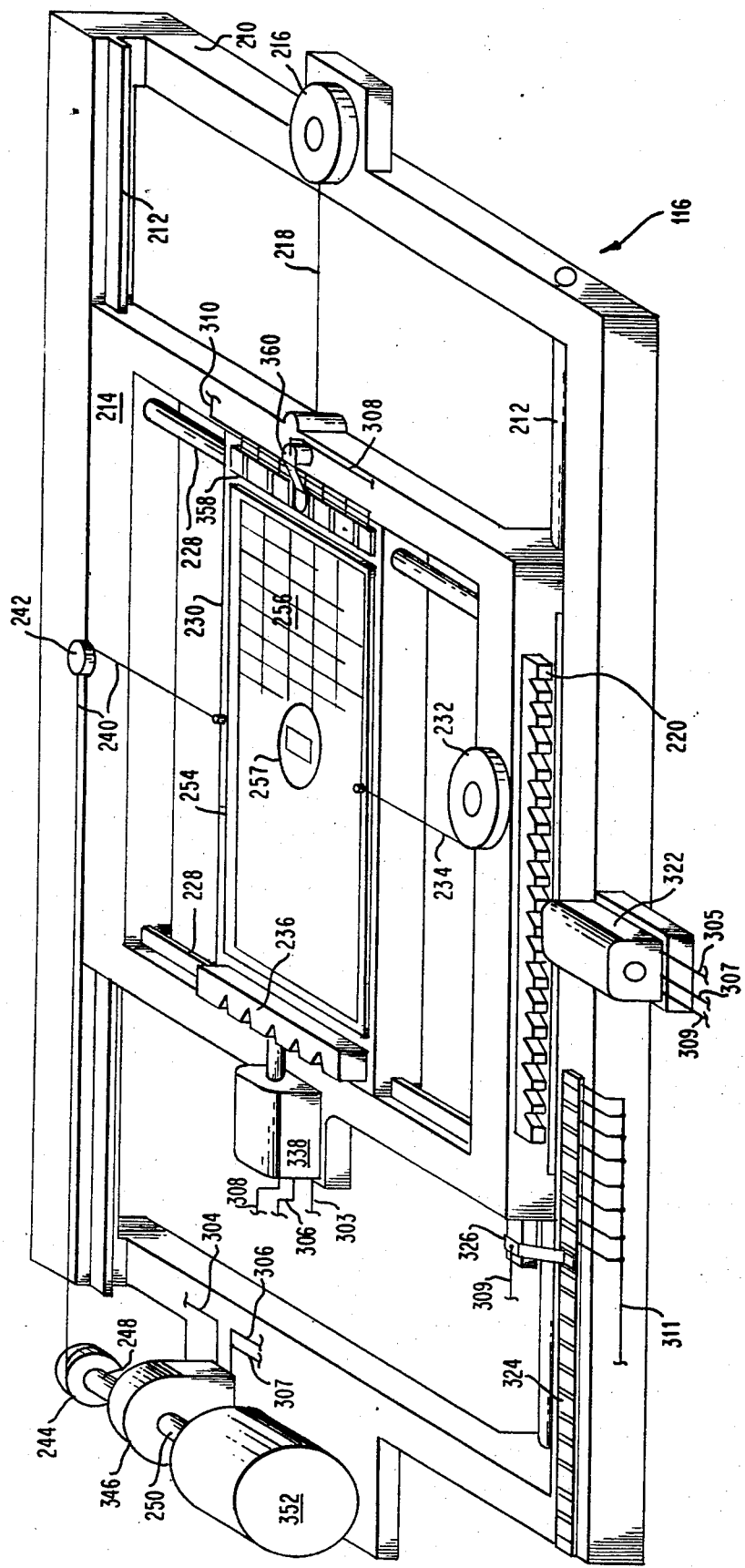
FIG. 2 is a prospective view of the X-Y table together with its power source and return spring motors and illustrating the electrical contact strips and brushes.

Continuously running electric motor 352 is mechanically connected through a shaft 250 in FIG. 2, to electromagnetic clutch 346.

Electromagnetic clutch 346 may be selected to be the type which must be energized in order to provide a mechanical output when provided with a mechanical input. Further solenoids 322 and 338 are of the type which when electrical current is flowing through the solenoid coils, plungers 323 and 339 are retracted into the solenoid coil. The double connection between the second terminal of clutch 346 and the two solenoids 322, 338 provides a continuous circuit activating the clutch 346 so long as either solenoid is activated.

The Y key switches 388 are connected to the individual segments of the Y slider strip 358 by lines 310. This provides a parallel circuit arrangement between the Y key switches 388 and the Y slider strip segments 358 where only one of the segments of the Y slider strip 358 is in contact with the Y slider 360.

In a similar arrangement to that discussed above X key switches 390 are serially connected to terminal 386 of power supply 382 by line 312. Likewise the X key switches 390 are parallel connected to the individual segments of X slider strip 324 by lines 311.

It is through the X and Y key switches 390, 388 that the address selected to be positioned in a defined zone is coded into the control circuit and controls the positioning of the X table 214 and Y table 230. The key switches 388, 390 can be manually operated switches which are opened and closed in response to manually operated keys or may be relays which are electrically controlled by some external control mechanism. This external control mechanism could well be a small special or general purpose computer or may be a large general purpose computer controlling many of these addressing relay sets on its peripheral equipment.

OPERATION OF THE INVENTION

For simplicity, operation of the invention will be described assuming the use of manual address keys to designate that portion of the object carried by the X-Y positioner which is supposed to be positioned in a predefined zone. Likewise the explanation will be carried out in the environment of a microfiche projection and enlargement apparatus.

To operate the X-Y positioner a microfiche transparency is placed under a transparent, preferably glass, cover 254 and is positioned on Y table 230.

The Y table 230 and X table 214 have home positions. These home positions are defined by X spring motor 216 and Y spring motor 232. These two spring motors 216, 232 retract the X table 214 toward the spring motor 216 and the Y table 230 toward the Y spring motor 232. Thus the home position for the X-Y positioning apparatus is displaced as far as possible in both coordinates from the take-up reel 244. In this position, X cable 218 and Y cable 234 are retracted and the X slider 326 and Y slider 360 are positioned on the endmost segments of slider strips 324 and 358. Assuming that X and Y key switches are operated by lettered and numbered keys and that the X positions are designated by letters and the Y positions are designated by numbers, the X positions for a 5 by 18 frame microfiche transparency would be designated A through T with I and O omitted to eliminate confusion. The Y keys would be designated numerically 1–5.

To view the pattern recorded at C2 the button or key representing C and the key representing 2 would be depressed. The depressing of the two buttons would perform two functions, first the opening of the X and Y key switches associated with the appropriate address keys, and secondly, the closing of all other X and Y key switches 390, 388. With the voltage and current connected from power supply 382 through terminal 386 to each of the X key switches 390 the slider strip segments associated with each of the X key switches 390 are likewise supplied with a voltage and current with the sole exception of the segment associated with the C switch which has been opened by the keying of the address.

Likewise a voltage is supplied to Y key switches 388 from the terminal 386 of power supply 382. In keying the address the switch corresponding to the key designated 2 is opened and the voltage is supplied through all the remaining Y key switches to their respective segments of Y slider strip 358. With double pole, single throw switch 380 closed to provide electrical voltage and current to both the power supply 382 and motor 352 the motor is continuously running driving the input shaft 250 to clutch 346.

When the X-Y positioner 116 is in its home position fully retracted by clock spring motors 216 and 232 the slider brushes 326 and 360 are in contact with the A and 1 segments of the X and Y slider strips 324 and 358.

When the line voltage is applied to both motor 352 and power supply 382 and the X and Y key switches 390, 388 have been opened for an address of C2 current flows through the A segment and the 1 segment of the X and Y slider strips contact 324 and 358 and completes the circuit through both the X and Y solenoids 322 and 338. This causes the retraction of X and Y solenoid plungers 323 and 339 thereby releasing the X table 214 and Y table 230 for movement. At the same time current and voltage are applied to the electromagnetic clutch 346 causing a connection between input shaft 250 and output shaft 248 illustrated in FIG. 2.

With output shaft 248 turning in response to the activated clutch 346, take-up reel 244 is driven by electric motor 352 and winds the cable 240 onto the take-up reel 244. Depending upon the strength of the springs in clock spring motors 216 and 232 and the table may move in one direction, then a second direction or if the springs are equal in strength and in resistance the two tables 214 and 230 may move in a compound X-Y direction. The motion of movement is immaterial since any movement in one direction, both directions, or the other direction only controls the freedom of movement for the direction in which the Y table 230 is ultimately moving. For illustrative purposes, it is assumed that the tables will first move in an X direction and then in a Y direction, however, it should be recognized that the coordinate directions of movement may be reversed or that they may be accomplished simultaneously.

As X table 214 moves in the X direction in response to the tension applied to cable 240 while being wound upon take-up reel 244 the X cable 218 is being pulled from X clock spring motor 216 and the X slider brush 326 is likewise moving in an X direction. As the X slider brush 326 is moved from the A segment of X slider strip 324 to the B segment of X slider strip 324 the electrical circuit between terminal 386 and 384 passing through X solenoid 322 and clutch 346 remains completed. As the above described movement in the X direction continues slider brush 326 contacts the C segment of slider strip 324 and when it moves out of electrical contact with the B segment current ceases to flow through the circuit because the C segment has no current or voltage applied to it since the X key switch associated with it has been opened when the address code was keyed into the circuit. When the circuit is broken by X slider 326, X solenoid plunger 323 is released by X solenoid 322 and is allowed to move into the appropriate cam surface on X centering rack 220. This movement of X solenoid plunger 323 locks X table 214 and X centering rack 220 from further movement.

Also when X slider 326 contacts the C segment of X slider strip 324 the current supplied through this branch of the control circuit is interrupted and no longer supplied to clutch 346.

Since the Y table has not moved during the above described motion in a Y direction the Y slider strip 360 is still in contact with the 1 segment of the Y slider strip 358. Since the 1 key switch of the Y key switches 388 is closed current continues to flow between terminals 386 and 384 of power supply 322 through the Y slider strip 358, Y slider 360 and Y solenoid 338. The plunger 339 of Y solenoid 338 remains retracted permitting movement of Y table 230 along the Y slideways 228. Simultaneously current is flowing from slider 360 through electromagnetic clutch 346 thereby allowing the clutch to remain engaged and continue to drive take-up reel 244 and cause the tension and winding of cable 240. Since cable 240 is under tension and partially wrapped around pulley 242, the tension is transferred as a force to Y table 230 causing the Y table 230 to move in the Y direction only as X table 214 is latched in its C position and not allowed further movement. Cable 234 of Y clock spring motor 232 is unreeled and Y table 230 is moved in the Y direction. As Y table 230 moves in the Y direction the Y slider strip 358 moves under the relatively fixed Y slider 360 causing Y slider 360 to come into electrical contact with segment 2 of Y slider strip 358. Since the Y key switch associated with segment 2 has been opened during the address keying operation no current flows from terminal 386 through the Y address keys 388 to the Y slider 360 and therefore no current passes through Y solenoid 338 or electromagnetic clutch 346. Upon the breaking of this branch of the circuit Y solenoid 338 is deactivated and its plunger 339 is allowed to reset into the appropriate cam surface of Y centering rack 236. This accurately positions Y table 230 and prevents further movement which would otherwise be caused by the energy stored in Y spring motor 232. Likewise clutch 346 is disengaged by the breaking of the Y branch of the circuit allowing electric motor 352 to continuously run while interrupting the drive exerted on cable 240. As Y solenoid plunger 339 and X solenoid plunger 323 move into their appropriate cam surfaces in Y centering rack 236 and X centering rack 220 the Y table 230 and X table 214 are accurately positioned with respect to solenoids 323 and 338. This accomplishes the accurate positioning and repeatability of the positioning of the X-Y positioner.

So long as the switches corresponding to the address code remain open and the slider brushes 326 and 360 remain in contact with the associated segments of Y slider strip 358 and X slider strip 324 and X solenoid 322 and Y solenoid 338 will continue to prevent the movement of the X-Y positioner 116. With the microfiche rigidly attached to Y table 230 the microfiche is held in a designated fixed position thereby presenting one frame of the microfiche transparency to the optical system for enlargement and projection.

To return the X-Y positioner to its home position the X and Y solenoids 322 and 338 must be activated to retract their respective plungers 323 and 339. This must be accomplished while the clutch 346 is disengaged thereby allowing clock spring motors 216 and 232 to recoil their respective cables 218 and 234 causing the movement of the X table 214 and the Y table 230 to restore to their respective home positions. The return function is accomplished by the activation of a return key 392 which in turn closes all X and Y key switches and at the same time opens the connection 394 between terminal 384 of power supply 382 and electromagnetic clutch 346.

Between terminal 384 of power supply 382 and clutch 346 a relay or switch 394 is connected. This return switch 394 is activated by a return key 392. The return key 392 also is connected either electrically or mechanically (not shown) to the X key switches 390 and Y key switches 388. The operation of return key 392 opens return switch 394 and closes all opened X and Y key switches 390, 388. The operation of return key 392 accomplishes the completion of the X and Y branches of the solenoid circuits while preventing the engagement of clutch 346. Clutch engagement is prevented by the opening of the return switch 394 while X solenoid 322 and Y solenoid 338 are energized by the closing of the X key switch 390 and Y key switch 388 which had been used to select the appropriate frame on the microfiche transparency. In the above example, the X key switch C and Y key switch 2 were opened for the selection step. When the return key 392 is activated the C and 2 switches are closed thereby completing the circuit through those switches and to the X slider brush 326 and Y slider brush 360. When the X and Y solenoids are retracted the clock spring motors 216 and 232 are then permitted to retract their respective cables 218 and 234 causing the X table 214 and Y table 230 to return to the home position.

The foregoing explanation has been made with reference to a manual address keying operation where the operator, through some external knowledge, knows the address of the frame that is to be projected. However, the full capabilities of this system are best utilized where some sort of electronic device such as a general purpose computer selects the appropriate address code and activates relays in response to the computer output. The computer output would be determined by a question or other input from which the computer would either logically determine the desired address code or would derive the desired address code from memory as a result of a table look up. An example of such an arrangement would be where a terminal including the X-Y positioner disclosed would be located at a transportation facility. The home position for the microfiche displayed would have on it the first of a series of questions to be answered by a traveler desiring information about time-tables fares, facilities, or other information with regard to the transportation departing from that terminal.

The traveler, seeing such basic questions as "What region is your destination located in," "By what general type of travel are you interested in," and other similar questions, would push a button indicating the answer desired. For example, in response to "To what general region do you desire to travel?", the traveler may push a button indicating the New England states. In response to this answer the computer then selects the appropriate address code for the next succeeding frame providing questions related to the Northeastern states and narrowing the choices of the individual to specific regions or destinations. Following this procedure the succeeding frame of the microfiche is displayed and the traveler answers questions which evoke the presentation of still further frames until all the inquiries of the passenger or traveler have been answered. When the traveler has completed his inquiries and secured the desired information, he then pushes a reset key which then allows the positioner to return the X and Y tables to their respective home positions and present the first frame with the most generalized questions to the optical system of the projector thereby preparing the terminal for the use of the next customer or traveler.

Figure 1:
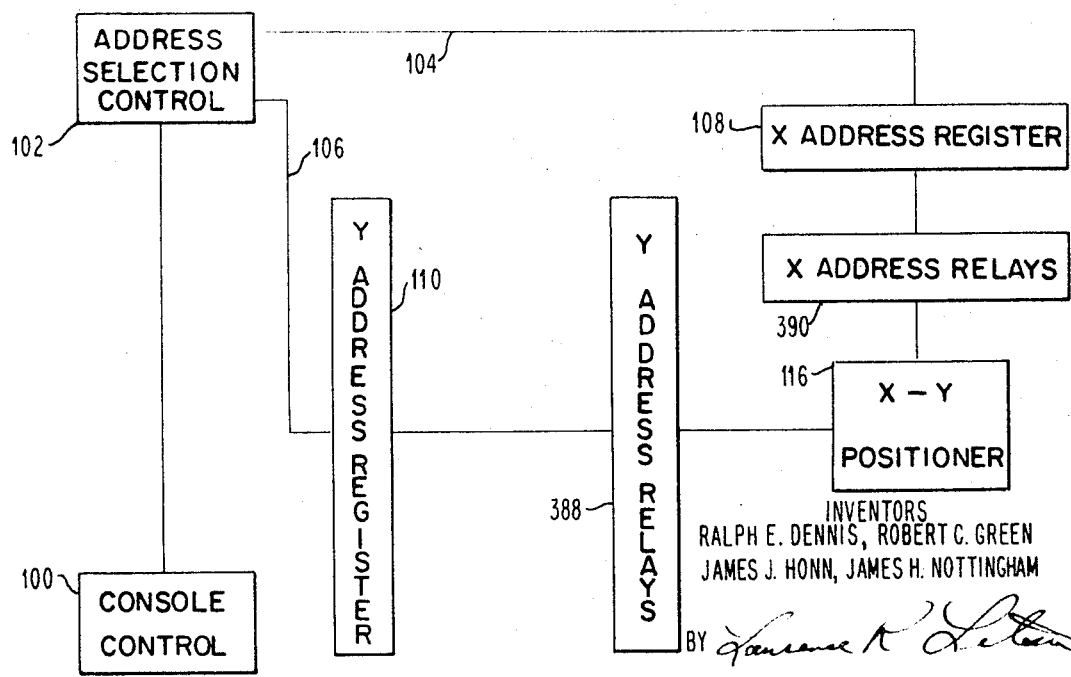
FIG. 1 is a block diagram of a computerized control of the X-Y positioner.

FIG. 1 illustrates a block diagram of a preferred embodiment of the computerized control of the X-Y positioner.

Console control 100 is electrically interconnected to the address selection control 102. The console control 100 would have buttons, keys, or other data input means to allow the person being served to enter data signals in response to inquiries. The address selection control derives a positioner location code from the question asked and answer given and provide an output through each line 104, 106 to the X and Y address registers 108, 110. The X and Y address registers 108, 110 in turn control the respective X and Y address relays 112, 114 and the result is the same as the manual control of the X and Y address key switches 390, 388. The X-Y positioner 116 responds to the settings of the X and Y address relays 112, 114 as described earlier with respect to X and Y address key switches 390, 388.

When the X-Y positioner 116 is under the control of a computer the computer may determine when the return relay 394 should be opened and when the addressing relays should be closed. All the relays will be under the control of the computer output in response to either its logic unit deriving the outputs from the information derived from the terminal or from a table look in its memory. Once the determination has been made as to what the address code is of the succeeding frame three courses of action may be initiated by the computer control. The first course of action will be where the letter code follows the letter position at which the X table is then located and where the number code is a higher numbered position than that position presently occupied by the Y table 230. Where this is the case the clutch may be engaged in response to the closing of the present address code switches or relays 390 and 388 and the solenoids retracted causing the drive motor 352 to continue driving the X and Y tables 214, 230 to the second frame address position. This may be accomplished only where the X and Y coordinates of the next succeeding frame can be addressed by activating the clutch 346.

The second possibility is where both address coordinates X and Y are between the present position coordinates and the home position for the respective X and Y tables 214, 230. In this case the appropriate address relays 390, 388 will be opened under computer control and the previous address relays closed under computer control completing the circuit through the solenoids. At the same time return relay 394 will be opened to prevent the clutch from engaging. Thus spring motor 216 and 232 will provide the required force to move the X and Y tables 214, 230 toward their home position. When the X slider brush 326 and Y slider brush 360 engage the appropriate contact segment of X slider strip 324 and Y slider strip 358 the solenoids will be de-energized because the circuit will no longer be complete and the appropriate tables 214 and 230 will be latched into the desired position.

The third alternative is where only one of the address codes may be accessed from the table's present position by driving the table to its desired position through cluth 346 take-up reel 244 and cable 240. The other position would then be between the present position and the home position for that respective table and coordinate. In this situation the return relay 394 will be opened and all X and Y address relays 390, 388 will be closed until the X table 214 and Y table 230 return to their home position. At this time the computer will then output a signal activating the appropriate address relays for the next succeeding frame to be displayed and the return relay will be closed completing the circuit between the power supply 382 and the clutch 346. This will cause the X-Y positioner to traverse as explained above and position the next desired frame within the viewing zone 257 for enlargement and projection.

The computer control may also be provided with a timing routine where the X-Y positioner 116 is automatically returned to its home position after a predefined time interval has elapsed during which no question has been responded to by the person operating the terminal. Thus the terminal will be returned to a condition where another traveler or customer may make inquiry if the previous traveler neglected to reset the X-Y positioner.

It will be apparent to one skilled in the art that by selecting solenoids which require energization to extend the plungers or armatures and by selecting an electromagnetic clutch which requires the additive voltages of both the X and Y branches of the circuit disclosed in FIG. 3 the control circuit may be defined in such a way as to require that the X and Y key switches 390, 388 corresponding to the desired address code, be closed to initiate the movement of the X-Y positioner and all other key switches would then remain open. Thus when both slider brushes 326 and 360 encountered a segment on their respective tables 214, 230 in a fixed position and when both solenoids were energized clutch 346 would be disengaged by the additive voltage effect. Further it should be recognized by one skilled in the art that the cables 218, 234 and 240 may be modified to include wires, chains, belts, ribbons or any other force transmitting member which may be wound and is sufficiently flexible to provide the disclosed functions.

One skilled in the art would recognize that a single cable and clock spring motor could be substituted for the two motors 216, 232 and cables 218, 234 by placing the motor on the corner of frame 210 nearest the X and Y tables 214, 230 home positions and passing the cable around a pulley similar to pulley 242. The cable would be connected to Y table 230. The direction change pulley would be mounted on X table 214 on the opposite side from pulley 242. This arrangement would reposition the X-Y positioner in its home position when clutch 346 is disengaged and solenoid 322, 338 are activated.

It should be further recognized that the explanation of the invention within the environment of a microfiche projector and enlarger does not restrict this invention to only that environment but it may be used in any environment which requires accurate and repeatable positioning of an object carried on an X-Y positioning table.

While the invention has been particularly shown and described with reference to preferred embodiments thereof, thereof, it will be understood by those skilled in the art that the foregoing and other changes in form and details may be made therein without departing from the spirit and scope of the invention.

We claim:

1. A two dimensional positioning apparatus for positioning an object in predefined positions accurately and repeatably comprising:
   a stationary support means;
   a first movable support means slidably mounted on said stationary support means for movement in a first direction, a second movable support means slidably supported on said first movable support means for movement in a second direction, said second direction perpendicular with respect to said first direction of said first movable support means;
   engagable drive means applying force to said first and second movable support means by a flexible force transmission means, one end of said flexible force transmission means attached to said drive means, the other end of said flexible force transmission means attached to said second movable support means and said first movable support means engaged with said flexible force transmission means intermediate its ends for moving the first and second movable support means in the first and second direction, respectively;

first centering means carried by said first movable support means and second centering means carried by said second movable support means, and first locking means attached to the stationary support means and second locking means attached to the first movable support means, said first and second locking means engagable with said first and second centering means, respectively for accurately locking said first and second movable support means with respect to their respective support means for accuracy and repeatability of positioning;

a first and second position selecting means connected to the first and second locking and centering means, respectively, and carried by said stationary support means and said first movable support means, respectively, to select the position of each of said movable support means and control said locking and centering means; and a repositioning means connected to said first and second movable support means for returning said first and second movable support means to a predefined starting position when said locking means and said drive means are disengaged.

2. The two dimensional positioning apparatus of claim 1 where said repositioning means comprises:

a spring means storing energy during the positioning of said first and second movable support means;

flexible force transmission means connected from said spring means to said first and second support means;

means for disengaging said locking and centering means; and means for disengaging said driving means, said drive means acting in a generally opposite direction to said spring means, so that said spring means may reposition said first and said second support means in a direction generally opposite that of the direction of the drive means.

3. The two dimensional positioning apparatus of claim 1 wherein said locking and centering means comprises:

cam surfaces carried by one of each pair of relatively movable support means;

plunger means for engaging said cam surfaces;

means for moving said plunger means into and out of engagement with said cam surfaces and carried by the other of each pair of relatively movable support means.

4. The two dimensional positioning apparatus of claim 3 wherein said energy storing means comprises a plurality of clock spring motors to store energy during the positioning of said movable support means and to provide energy to restore said movable support means to their home positions.

5. The two dimensional positioning apparatus of claim 1 further comprising:

control means to select and control the positions of said first and second movable support means, said control means further comprising a plurality of selectively operable relay for controlling each of said locking and centering means.

6. The two dimensional positioning apparatus of claim 5 wherein said control means includes manual address key switches for addressing predefined positions in each of said two directions.

7. The two dimensional positioning apparatus of claim 5 wherein said control means comprises:

a computer connected to said relays for selection and control of the positions of said movable support means.

* * * * *

UNITED STATES PATENT OFFICE
CERTIFICATE OF CORRECTION

Patent No. 3,744,891   Dated July 10, 1973

Inventor(s) Ralph E. Dennis, Robert C. Green, James J. Honn and James H. Nottingham It is certified that error appears in the above-identified patent and that said Letters Patent are hereby corrected as shown below:

Column 14, Claim 4, line 2, "energy storing" should be --spring--.

Signed and Sealed this ninth Day of September 1975

[SEAL]

Attest:

RUTH C. MASON
Attesting Officer

C. MARSHALL DANN
Commissioner of Patents and Trademarks